United States Patent [19]
Koyama et al.

[11] Patent Number: 4,878,078
[45] Date of Patent: Oct. 31, 1989

[54] FOCUS DETECTING DEVICE AND METHOD OF MAKING SAME

[75] Inventors: Takeshi Koyama; Keiji Ohtaka, both of Tokyo; Yasuo Suda, Yokohama, all of Japan

[73] Assignee: Canon Kabushiki Kaisha, Tokyo, Japan

[21] Appl. No.: 190,171

[22] Filed: May 4, 1988

[30] Foreign Application Priority Data

May 14, 1987 [JP] Japan .................. 62-117627

[51] Int. Cl.$^4$ ............................................. G03B 3/00
[52] U.S. Cl. ..................................... 354/402; 354/406
[58] Field of Search ............... 354/400, 402, 406, 407, 354/408, 195.1; 356/4

[56] References Cited

U.S. PATENT DOCUMENTS 4,768,052  8/1988  Hamada et al. .............. 354/402
4,774,539  9/1988  Suda et al. .................. 354/406

*Primary Examiner*—Russell E. Adams
*Attorney, Agent, or Firm*—Fitzpatrick, Cella, Harper & Scinto

[57] ABSTRACT

In a focus detecting device having a secondary image unit disposed rearwardly of the predetermined imaging plane of an objective lens, a plurality of pairs of object images based on light fluxes passing through different portions of the pupil of the objective lens are formed on a photoelectric conversion element array disposed rearwardly of the secondary imaging unit. The focus of the objective lens is detected from the amount of relative deviation between the object images formed on the photoelectric conversion element array. The secondary imaging unit includes at least two members, a first member having a first pair of lens-acting surfaces and a second pair of lens-acting surfaces on one end thereof, and a second member having a first pair of prism surfaces and a second pair of prism surfaces which differ in refractive power from each other. The second member being fixed to the first member after being rotatively adjusted relative to the first member.

11 Claims, 6 Drawing Sheets

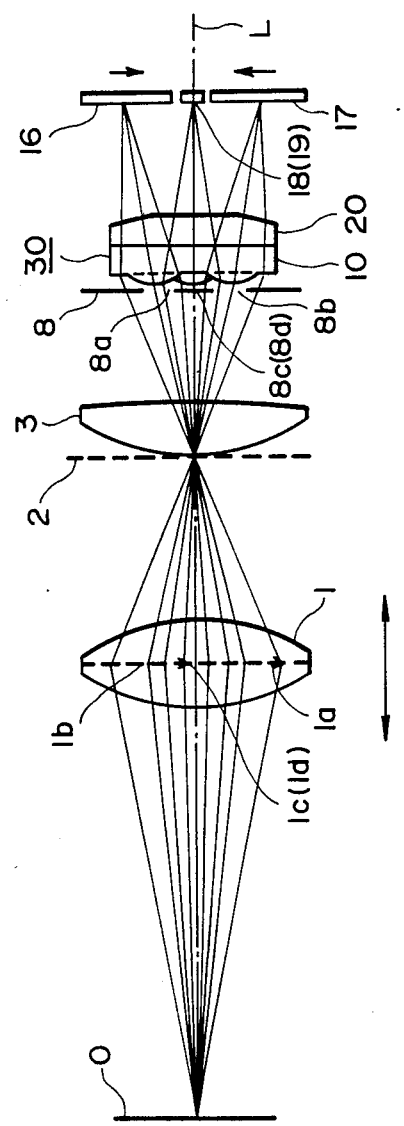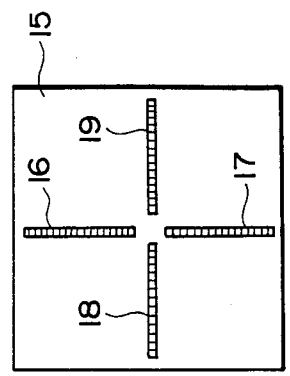

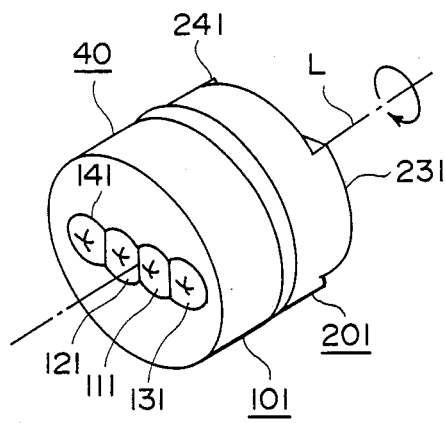
F I G. 4
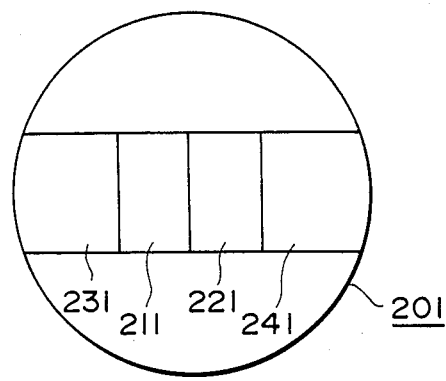
F I G. 5A
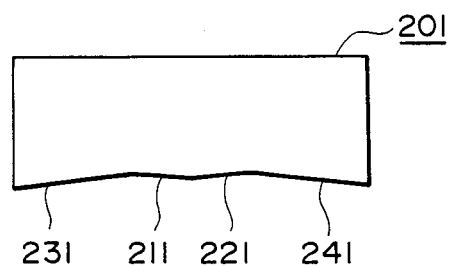
F I G. 5B

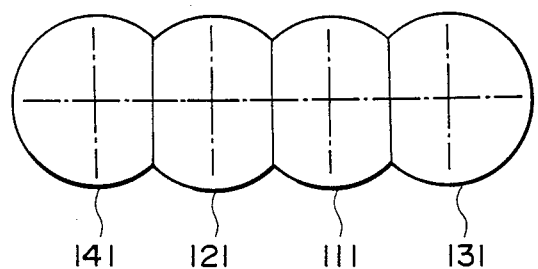
F I G. 8
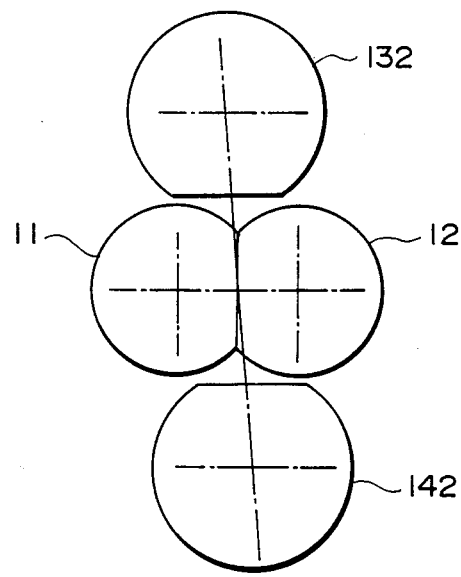
F I G. 9

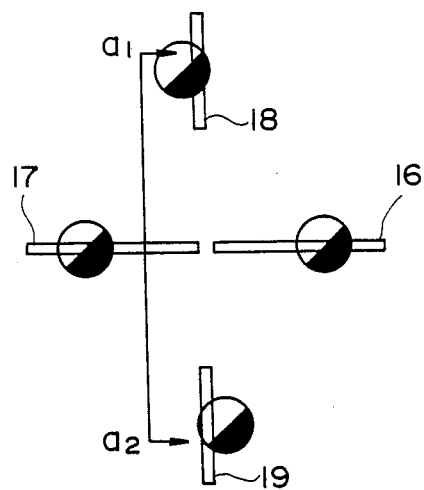
F I G. 10A
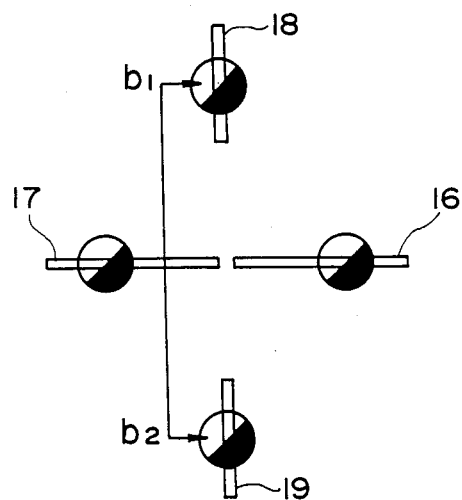
F I G. 10B

FOCUS DETECTING DEVICE AND METHOD OF MAKING SAME

BACKGROUND OF THE INVENTION

1. Field of the Invention

This invention relates to a focus detecting device, and in particular to a focus detecting device suitable for use in a photographic camera, a video camera or the like in which a plurality of pairs of object images are formed by a plurality of pairs of secondary imaging lenses disposed rearwardly of an objective lens and discrimination of the in-focus state of the objective lens is effected from the amount of deviation between each pair of object images. The invention also relates to a method of manufacturing such a device.

2. Related Background Art

In single-lens reflex cameras or the like, use has heretofore often been made of a so-called image deviation type focus detecting device in which, on the basis of light fluxes from two different portions of the pupil of an objective lens, two object images are formed on a photoelectric conversion element array by a pair of secondary imaging lenses. The focus state of the objective lens is then detected from the relative positional relation between these object images.

However, the direction of arrangement of the pair of secondary imaging lenses is limited to one direction. Therefore, for example, in the case of an object having a pattern in a direction orthogonal to the direction of arrangement of the photoelectric conversion element arrays disposed correspondingly to the secondary imaging lenses, focus detection is possible. However, in the case of an object having only a pattern in the direction of the photoelectric conversion element arrays, any change in the object image cannot be detected and thus, focus detection becomes impossible.

Also, where a focus detecting device of the above-described construction is used as the focus detecting device of an interchangeable lens type camera such as a single-lens reflex camera, the distance between the vertices of a pair of secondary imaging lenses is also set in accordance with a dark lens of great F-number. Therefore, even when a bright lens of small F-number which inherently requires highly accurate focus detection is mounted to the camera, the limit of focus detection accuracy becomes the same as that when a dark lens is mounted to the camera, and highly accurate focus detection becomes difficult.

In order to solve the above-noted problems, a method of installing a plurality of pairs of secondary imaging lenses has been proposed in U.S. application Ser. No. 313,343. Also, devices in which the directions of arrangement of two pairs of secondary imaging lenses are orthogonal to each other, as shown in FIG. 7 of the accompanying drawings, have been proposed in U.S. application Ser. No. 102,622 and U.S. Pat. No. 4,774,539. There is also conceivable a device in which, as shown in FIG. 8 of the accompanying drawings, the directions of arrangement of two pairs of secondary imaging lenses are the same, but the distances between the vertices of these two pairs of secondary imaging lenses differ from each other. In FIG. 7, lenses 11 and 12 and lenses 13 and 14 form respective pairs, and in FIG. 8, lenses 111 and 121 and lenses 131 and 141 form respective pairs.

However, when manufacturing a member constructed of said two pairs of secondary imaging lenses, if the secondary imaging lenses are molded as a unit or cemented together, the degree of perpendicularity and the degree of parallelism of two straight lines passing through the vertices of the two pairs of lenses will fail to be strictly 90 degrees and 0 degree, respectively, and a manufacturing error, though slight, will occur.

In contrast, as regards the arrangement of photoelectric conversion elements, the manufacturing error is very small and its influence upon the function of the device is usually negligible.

FIG. 9 of the accompanying drawings is an illustration expressing an exaggerated lens state in which the degree of perpendicularity of the two pairs of secondary imaging lenses is spoiled though slightly. In FIG. 9, lenses 11 and 12 and lenses 132 and 142 form respective pairs.

Here, when the two pairs of secondary imaging lenses whose degree of perpendicularity is spoiled is in the state as shown in FIG. 9, if an attempt is made to photograph an object comprising, for example, edges of 45° with the direction of photoelectric conversion element arrays being adjusted to the vertices of the lenses 11 and 12, the positional relation between the object image and the photoelectric conversion element arrays will be such as shown in FIG. 10 of the accompanying drawings. FIG. 10A shows the positions of the object images when an error in the degree of perpendicularity at which the directions of arrangement of the two pairs of secondary imaging lenses are orthogonal to each other occurs as shown in FIG. 9. FIG. 10B shows the positions of the object images when in the state shown in FIG. 7 in which there is no error in the degree of perpendicularity at which the directions of arrangement of the two pairs of secondary imaging lenses are orthogonal to each other. In FIG. 10, the reference numerals 16 and 17 and the reference numerals 18 and 19 designate pairs of photoelectric conversion element arrays provided to receive the object images formed by the lenses 11 and 12 and lenses 13 and 14 of FIG. 7. It will be seen that the distance between the object images on the photoelectric conversion element arrays 18 and 19 differs between a1, a2 of FIG. 10A and b1, b2 of FIG. 10B and therefore accurate focus detection cannot be accomplished for such a pattern which is oblique to the photoelectric conversion element arrays as in this example.

This also holds true of the two pairs of secondary imaging lenses as shown in FIG. 8, and focus detection will become inaccurate unless the degree of parallelism of the straight line passing through the vertices of the lenses 131 and 141 to the straight line passing through the vertices of the lenses 111 and 121 is substantially zero degree without being spoiled by a manufacturing error.

SUMMARY OF THE INVENTION

It is an object of the present invention to provide a device for detecting the focus adjusted state of an objective lens, and method for making such a device.

It is another object of the present invention to provide a device in which any manufacturing errors in constituent members can be compensated for.

It is still another object of the present invention to provide a method of compensating for any manufacturing errors in constituent members.

BRIEF DESCRIPTION OF THE DRAWINGS

FIG. 1A is an optical cross-section showing an embodiment of the present invention.

FIG. 1B is a front view of a constituent member of the FIG. 1A embodiment.

FIGS. 2 and 4 are perspective views of an optical member comprising a first member and a second member according to the present invention.

FIGS. 3A and 3B and FIGS. 5A and 5B illustrate the second member according to the present invention, FIGS. 3A and 5A being rear views, and FIGS. 3B and 5B being side views.

FIG. 8 illustrates an arrangement in which the directions of arrangement of two pairs of lens surfaces are parallel to each other.

FIG. 9 illustrates a case where the arrangement of the two pairs of lens surfaces of FIG. 7 is spoiled by a manufacturing error.

FIGS. 10A and 10B illustrate the states of the object images on photoelectric conversion element arrays when use is made of the two pairs of lens surfaces of FIG. 9 whose degree of perpendicularity is spoiled, FIG. 10A showing the before-correction state, and FIG. 10B showing the after-correction state.

DESCRIPTION OF THE PREFERRED EMBODIMENTS

Figure 2:
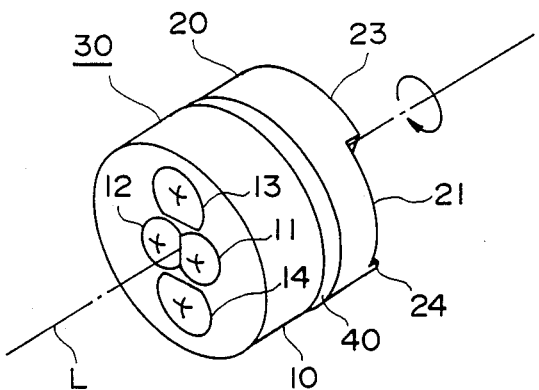

FIG. 1 is a schematic view showing an embodiment of the present invention. In FIG. 1, the reference character 0 designates the surface of an object, the reference numeral 1 denotes an objective lens removably mounted to a single-lens reflex camera body, not shown, the reference numeral 2 designates the predetermined imaging plane of the objective lens 1 (a plane equivalent to the focal plane in the camera), and the reference numeral 3 denotes a field lens provided near the predetermined imaging plane 2 of the objective lens 1. The reference numeral 30 designates a secondary imaging unit having the function of a secondary imaging lens which directs the object image by the objective lens 1 onto a photoelectric converting device 15 (FIG. 1B) and comprising a first member 10 having two pairs of lens-acting surfaces and a second member 20 having two pairs of prism-acting surfaces. The secondary imaging unit 30 causes four object images to be formed on the basis of light fluxes passing through different portions 1a, 1b and 1c, 1d of the pupil of the objective lens 1. It has been proposed in U.S. application Ser. No. 877,850 to correct the image distortion by the prism surfaces. The reference numerals 16, 17 and 18, 19 designate photoelectric conversion element arrays which detect the respective object images formed by the secondary imaging unit 30 having the function of a secondary imaging lens. The photoelectric conversion element arrays may suitably be, for example, CCD's (charge coupled devices) or the like. The reference numeral 8 denotes a mask provided near the secondary imaging unit 30, and the field lens 3 projects the openings 8a, 8b and 8c, 8d in the mask 8 onto the different portions 1a, 1b and 1c, 1d of the pupil of the objective lens 1. When the objective lens 1 is moved leftwardly as viewed in FIG. 1 to bring about a forward or front focus state, the object images based on the object surface 0, that are formed on the light-receiving surfaces of the respective photoelectric conversion element arrays 16, 17, 18, 19 by the secondary imaging unit 30, deviate in the direction of the arrows. Therefore, the objective lens being in the front focus state and the amounts of deviation are detected by virtue of variations in the outputs of the photoelectric conversion element arrays 16, 17, 18, 19 corresponding to the relative deviation of these images. In the case of a backward or rear focus state, the respective images deviate in the direction opposite to that in the case of the front focus state and therefore, the objective lens being in the rear focus state and the amounts of deviation are detected to thereby accomplish focus detection.

In this case, as regards the surface of the secondary imaging unit 30 on which the light flux of the object image is incident, said two pairs of lens-acting surfaces are constructed either by shaping a lens unitarily or by cementing lenses together, but if for example, said two pairs of lens-acting surfaces are disposed so that the directions of arrangement thereof are orthogonal to each other and the photoelectric conversion element arrays 16, 17, 18, 19 are also disposed so as to correspond thereto, said amounts of image deviation can be accurately detected for any object having any shape (pattern), whereby highly accurate focus detection can be accomplished.

Figure 7:
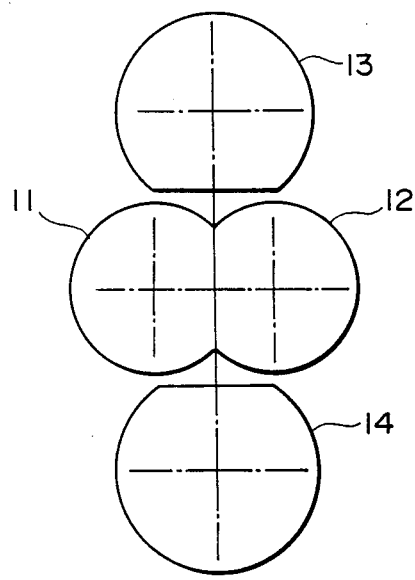
FIG. 7 illustrates an arrangement in which the directions of arrangement of two pairs of lens surfaces are orthogonal to each other.

FIG. 2 is a perspective view showing the secondary imaging unit 30 having the function of a secondary imaging lens according to the FIG. 1A embodiment of the present invention. In FIG. 2, the reference numeral 10 designates the first member having one end as a lens-acting surface and the other end made planar. The reference numeral 20 denotes the second member having one end as a prism-acting surface and the other end made planar, and the reference numerals 11, 12, 13 and 14 designate convex lens surfaces which are of the same configuration as that shown in FIG. 7. The reference numerals 21, 22, 23 and 24 denote prism surfaces, and the letter L designates the optic axis of the objective lens of FIG. 1A. Assuming that a reflecting surface is provided in the optical arrangement, this figure corresponds to a view in which the optic axis has been developed at the reflecting surface. The secondary imaging unit 30 is constructed of the first and second members 10 and 20 disposed with their planar portions opposed to each other, and the second member 20 is rotatable about the optic axis L relative to the first member 10. The two members are coupled together by a cylinder 40 or adhesively secured to each other after their relative angle is adjusted.

Figures 3A, 3B:
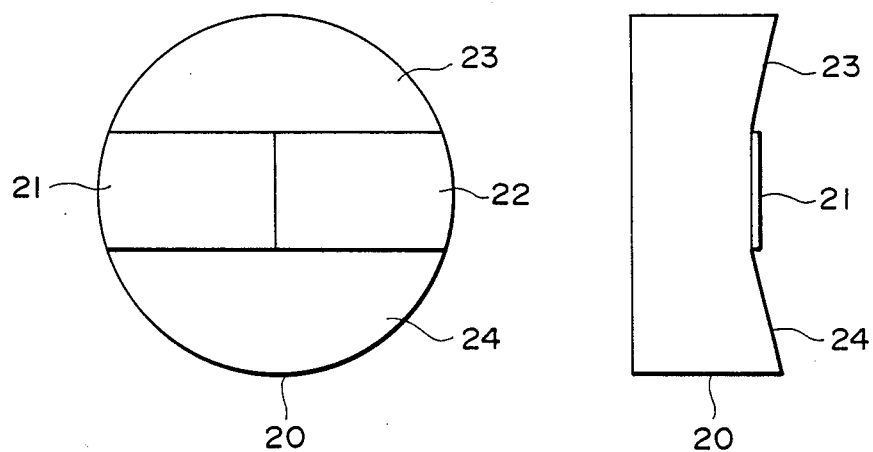

FIGS. 3A and 3B show the second member 20 which constitutes the secondary imaging unit 30 of FIG. 2, FIG. 3A being a rear view and FIG. 3B being a side view. In FIGS. 3A and 3B, the reference numeral 20 designates a prism body which is the second member, and the reference numerals 21, 22, 23 and 24 denote prism surfaces through which light fluxes passed through the lens surfaces of the first member 10 pass. The first pair of prism surfaces 21, 22 and the second pair of prism surfaces 23, 24 differ from each other in the angle of inclination with respect to a plane perpendicular to the optic axis L of the objective lens 1. For example, in the present embodiment, the prism surfaces 21 and 22 are sloped oppositely to each other to form a mountain shape, and the prism surfaces 23 and 24 form a valley shape.

For example, the surfaces 21 and 22 may in some cases be planar surfaces perpendicular to the optic axis, namely, surfaces having an angle of inclination of zero degree. Also, the angles of inclination of the surfaces 23 and 24 may in some cases be somewhat changed for adjustment of the optical performance.

As the second member 20 is rotated little by little about the optic axis L of the objective lens relative to the first member 10, light fluxes will pass through the first pair of lens surfaces 11, 12 and the second pair of lens surfaces of the first member 10 because the refractive powers of the inclined prism surfaces 21 and 22 and the prism-acting surfaces 23 and 24 of the second member 20 differ from each other. Further, when the light fluxes emerge from the respective corresponding pairs of prism surfaces of the second member, the influences imparted to the directions of travel of the light fluxes differ and therefore, if the directions of travel of the light fluxes are suitably set, the optical path will be corrected.

In this manner, the deviation on the photoelectric conversion element arrays of the object image caused by the lens-acting surfaces of the first member 10 whose degree of perpendicularity has been spoiled can be corrected. At this time, not only the second member 20 is rotated but also the first member 10 is rotated and along therewith, a member, not shown, on which photoelectric conversion element arrays are arranged correspondingly to the arrangement of the lens surfaces 11, 12, 13, 14 of the first member is also rotated. Thus, highly accurate fine adjustment becomes possible, and the position of the object image can be corrected, for example, from the condition of FIG. 10A to the condition of FIG. 10B.

FIGS. 4, 5A and 5B are schematic views showing another embodiment of the FIG. 1 secondary imaging unit 30 according to the present invention. Of these figures, FIG. 4 is a perspective view showing another embodiment of the secondary imaging unit 30 of FIG. 2. In FIG. 4, the reference numeral 40 designates the secondary imaging unit, the reference numerals 101 and 201 denote a first member and a second member similar in construction to those in FIG. 8, and the reference numerals 111, 121, 131 and 141 designate convex lens surfaces. The distance on the optic axis between the convex lens 111 and 121 is smaller than the distance on the optic axis between the convex lens 131 and 141. The reference numerals 231, 211, 221 and 241 denote prism surfaces, and the letter L designates the optic axis of an objective lens, not shown. As in FIG. 2, the second member 201 is rotatable about the optic axis L relative to the first member 101.

FIGS. 5A and 5B show the second member 201 which constitutes the secondary imaging unit 40 of FIG. 4, FIG. 5A being a rear view and FIG. 5B being a side view. In FIGS. 5A and 5B, the reference numeral 201 designates the second member body, and the reference numerals 211, 221 and 231, 241 denote prism surfaces forming pairs. These prism surfaces are constructed correspondingly to the arrangement of the lens surfaces 111, 121, 131, 141 of the first member shown in FIG. 4. Here the prism surfaces 211, 221 and the prism surfaces 231, 241 differ from each other in the angle of inclination with respect to a plane perpendicular to the optic axis L of the objective lens 1, and as shown in FIG. 5B, the prism surfaces 211 and 221 form a mountain shape and the prism surfaces 231 and 241 form a valley shape.

As in the case where the directions of arrangement of the two pairs of lens surfaces shown in FIG. 2 are orthogonal to each other, the first member 101, the second member 201 and an unshown photoelectric conversion element array are rotated by any angles respectively, whereby light fluxes passed through the respective lens surfaces of the first member 101 are refracted by the prism-acting surfaces of the second member 201 to correct the optical path and thus, the object image on said photoelectric conversion element array can be modified into its regular position.

Figures 6A, 6B:
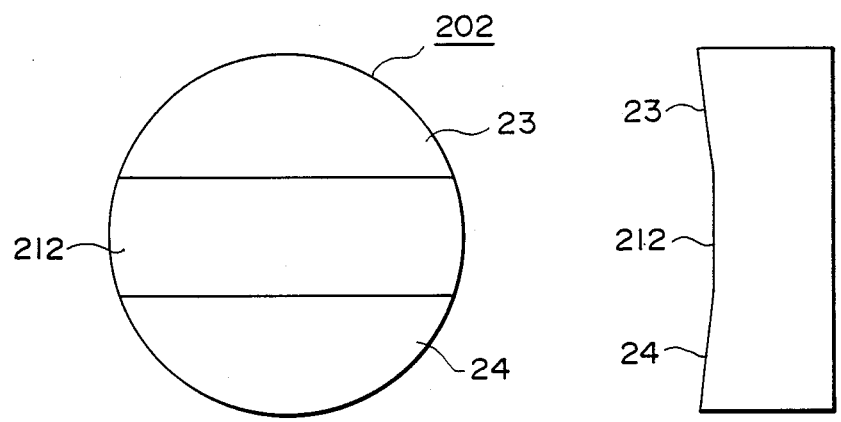
FIG. 6 illustrates another embodiment of the second member according to the present invention.

FIGS. 6A and 6B show another embodiment of the second member which constitutes the secondary imaging unit, 30 according to the present invention. In FIG. 6A, the reference numeral 202 designates the second member body, the reference mumerals 23 and 24 denote prism surfaces forming a pair, and the reference numeral 212 designates a planar surface which is perpendicular to the optic axis L of the objective lens 1 and which corresponds to the prism surfaces 21, 22 shown in FIG. 3. Unlike the prism surfaces of FIGS. 3 and 5, the planar surface 212 has an angle of inclination of zero degree, that is, it is a surface perpendicular to the optic axis. The prism surfaces 23 and 24 somewhat differ from each other in the angle of inclination. Where, as shown for example in FIG. 2, the second member 202 is used in combination with the first member 10, light fluxes passed through the lens surfaces 11 and 12 pass through the planar portion 212 of the second member 202, but even if the second member 202 is rotated relative to the first member 10, refraction of light will not occur in the planar portion 212 and therefore, the object image will not move.

Accordingly, if the second member 202 according to the present embodiment is used when with the lens surfaces 11, 12 as the reference, the positions of the photoelectric conversion element arrays corresponding thereto are adjusted to each other and only the error in the degree of orthogonality of the direction of arrangement of the lens surfaces 13, 14 relative to the direction of arrangement of the lens surfaces 11, 12 is to be modified, only the light fluxes passing through the prism surfaces 23, 24 will be refracted and therefore, adjustment will be easy and convenient to do in that only the position of the object image on the photoelectric conversion element array corresponding thereto can be corrected.

A similar effect can be expected even where conversely to the aforedescribed case, in the divided prism surface condition shown in FIG. 3A, only the portions corresponding to the prism surfaces 23, 24 are made into planar surfaces perpendicular to the optic axis L and the refractive power for the passing light flux is 0. Also, a similar effect can be expected even where in the divided prism surface condition shown in FIG. 5A, one pair of the two pairs of prism surfaces is made into planar surfaces perpendicular to the optic axis L.

Further, after the fine adjustment for the above-described correction of the object image has been done, the first member (10, 101) and the second member (20, 201, 202) are adhesively secured and fixed to each other, whereby they are made into a unit. This is convenient for decreasing the reflecting surfaces which adversely affect the imaging and for eliminating ghosts.

The pairs of prism surfaces of the second member 20, 201 shown in FIGS. 3A, 3B and 5A, 5B in the above-described embodiments are a combination of a mountain shape and a valley shape or a combination of planar surfaces perpendicular to the optic axis L, but they may be comprised of other type of combinations if the angles of inclination of the two pairs of prism surfaces with respect to the plane perpendicular to the optic axis L, including zero degree, differ from each other. For example, they may be a combination of a valley shape and a valley shape or a combination of a mountain shape and a mountain shape.

Also, of the first member (10, 101) and the second member (20, 201, 202), in the present embodiment, the first member is disposed forwardly, but a similar effect can be expected even if the second member is disposed forwardly.

According to the present invention, there can be achieved a so-called image deviation type focus detecting device having a secondary imaging unit having a plurality of pairs of lens surfaces and wherein the deviation of the object image on the photoelectric conversion element array resulting from the manufacturing errors in the degree of perpendicularity and the degree of parallelism of the pairs of lens surfaces of the secondary imaging unit in the direction of arrangement thereof can be corrected by rotating the second member having prism surfaces corresponding to the positions of the pairs of lens surfaces of the first member having the function of a secondary imaging lens. by a predetermined angle and highly accurate focus detection is always possible without being affected by the shape of the object whichever pair of the plurality of pairs of lens surfaces is used for focus detection.

We claim:

1. A device for detecting the focus adjusted state of an objective lens, comprising:
   a first member having a plurality of pairs of lens portions for forming, from the image formed by the objective lens, a pair of secondary images whose relative position varies in conformity with the focus adjusted state of the objective lens;
   a second member rotatively adjusted relative to the first member and having first and second planar surfaces, said first planar surface differing in angle of inclination from said second planar surface; and
   a plurality of sensing means for sensing a pair of light distributions corresponding to said secondary images, said sensing means having a plurality of photoelectric conversion elements.

2. The device of claim 1, wherein said lens portions are convex spherical surfaces.

3. The device of claim 1, wherein the distances between the optic axes of said plurality of pairs of lens portions differ from each other.

4. The device of claim 3, wherein directions of arrangement of said plurality of pairs of lens portions are orthogonal to each other.

5. The device of claim 3, wherein said plurality of pairs of lens portions are arranged in a row.

6. The device of claim 1, wherein said second member has a plurality of inclined surfaces, including said first and second planar surfaces, respectively corresponding to said lens portions, which are perpendicular to the optic axis of said objective lens.

7. The device of claim 6, wherein a pair of said planar surfaces are oppositely sloped and have the same angle of inclination.

8. The device of claim 6, wherein a first pair and a second pair of said planar surfaces differ in angle of inclination from each other.

9. In a focus detecting device having a secondary imaging unit disposed rearwardly of the predetermined imaging plane of an objective lens, a plurality of pairs of object images based on light fluxes passing through different portions of the pupil of said objective lens are formed on a photoelectric conversion element array disposed rearwardly of said secondary imaging unit, whereby the focus of said objective lens is detected from the amount of relative deviation between the object images formed on said photoelectric conversion element array, the secondary imaging unit comprising:
   a first member having a plurality of lens-acting surfaces on one end thereof; and
   a second member adjacent said first member and having a plurality of prism-acting surfaces on one end thereof, said prism-acting surfaces comprising a plurality of pairs of prism surfaces having different angles of inclination, including zero degree, with respect to a plane perpendicular to the optic axis of said objective lens, adjoining lateral surfaces of said first member and said second member being flat.

10. The focus detecting device of claim 9, wherein said first member and said second member are disposed with their respective lateral surfaces opposed to each other, and wherein said second member is rotatable about the optic axis of said objective lens relative to said first member.

11. A method for manufacturing a device for detecting a focus detection state of an objective lens, said device having (a) a first member having a plurality of pairs of lens portions for forming, from the image formed by the object lens, a pair of secondary images whose relative position varies in conformity with the focus adjusted state of the objective lens; (b) a second member having first and second planar surfaces, the first planar surface differing in angle of inclination from the second planar surface; and (c) a plurality of sensing means for sensing a pair of light distributions corresponding to said secondary images, the sensing means having a plurality of photoelectric conversion elements, said method comprising the steps of:
   rotatively adjusting said first member and said second member with respect to each other; and
   securing said first member and said second member in their rotatively adjusted positions.

* * * * *